Aug. 5, 1958 M. R. ARNOLD ET AL 2,846,395
CHARGING COMPOUND FOR THERMOSTATS
Filed Dec. 9, 1953
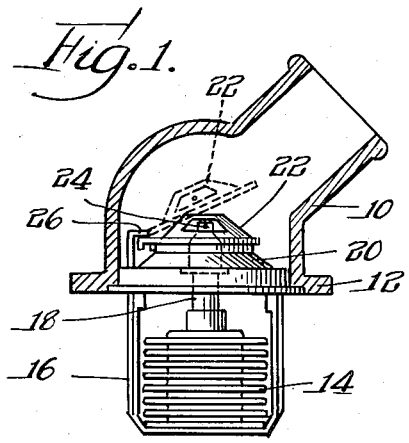
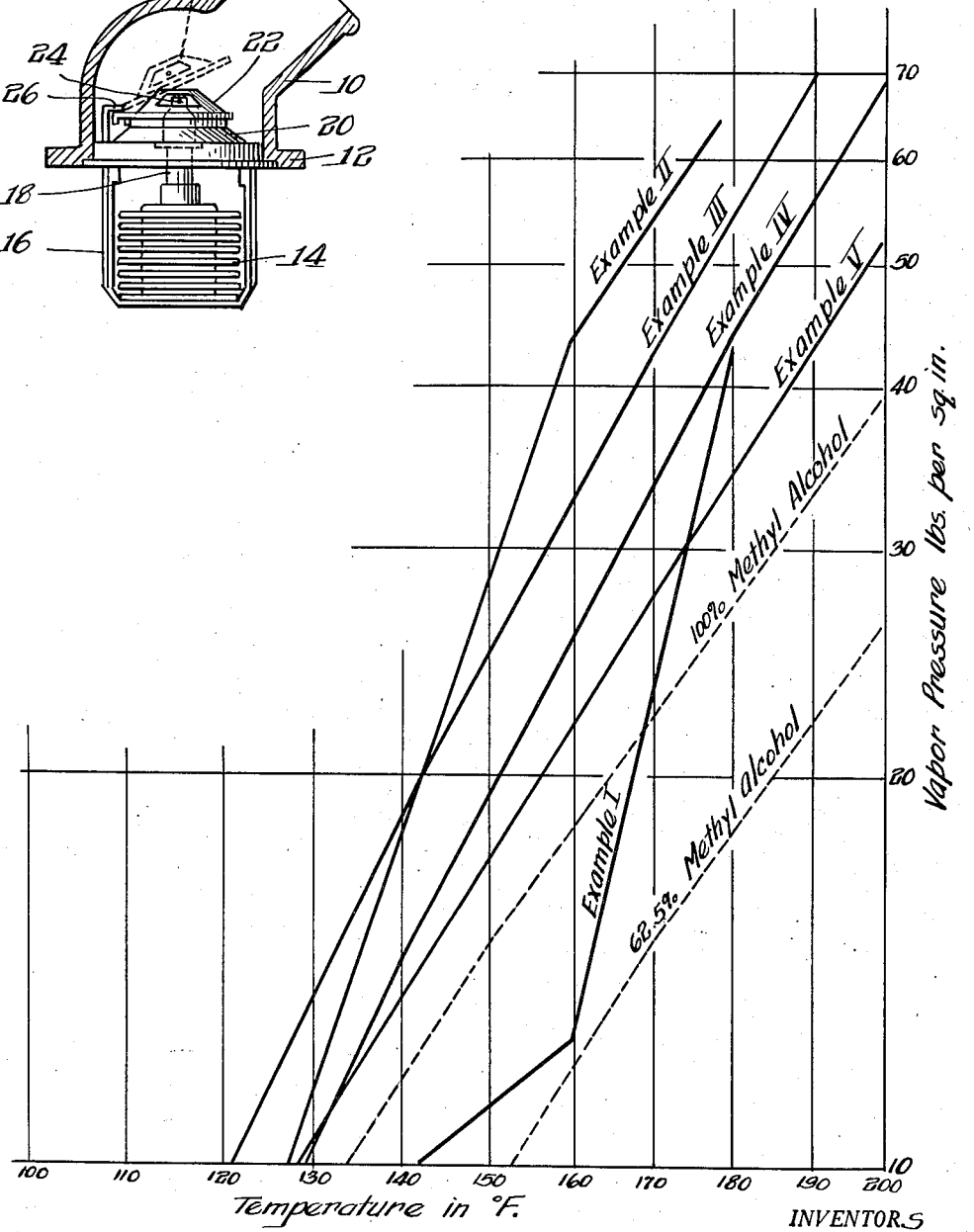
INVENTORS
Melvin R. Arnold
BY Loren A. Bryan
Olson & Trexler
Attys United States Patent Office 2,846,395
Patented Aug. 5, 1958

2,846,395

CHARGING COMPOUND FOR THERMOSTATS

Melvin R. Arnold, Chicago, Ill., and Loren A. Bryan, Alexandria, Va., assignors to Flexonics Corporation, Maywood, Ill., a corporation of Illinois Application December 9, 1953, Serial No. 397,082

3 Claims. (Cl. 252—67)

This invention relates to charging compositions for use in thermostats.

Certain types of thermostats respond to changes in temperature by moving an operating member a short distance, this minute movement of the operating member throwing a switch or some other device which serves to control another device in a desired manner. Other types of thermostats must furnish a substantial movement of a control member and a substantial force to perform work on another device. The present invention is applicable to both types of thermostats but has particular advantages when utilized with the second type of thermostat in which a substantial amount of force must be produced by the thermostat in order to permit the operating member thereof to perform work.

An example of the type of thermostat in which the operating member must perform substantial work is the thermostat in the cooling system of the present type of automobiles. The invention will be discussed in connection with this type of thermostat but it is to be understood that the invention can be utilized with any of the other types of thermostats.

An object of the invention is to produce a charge for a thermostat which can perform a greater amount of work for a given change of temperature than can the thermostats commonly used today; more particularly it is an object of the invention to provide a charging composition for the thermostat which will produce a greater amount of work for a given change of temperature.

Another object of the invention is to provide a charging composition for thermostats which produces a greater change in pressure for a given change in temperature over a desired range.

Yet another object of the invention is to provide a charging composition for thermostats in which the change of pressure with a given temperature change at a specified temperature can be controlled and adjusted.

It has now been found that these and other objects and advantages are obtained by providing means forming an expansible chamber having a shiftable wall, a member operated by said wall, and a charging composition within said chamber, said composition including ammonia and an acidic gas reversibly reactable with ammonia. At the lower temperatures the acidic gas and the ammonia react to form a material having a relatively small vapor pressure, and the ammonia and acidic gas dissociate at higher temperatures to produce substantial increases in pressure. In a preferred form of the invention a solvent consisting of water and water soluble, neutral, oxygenated organic compounds is utilized in the charging composition.

In the accompanying drawing:

Figure 1 is a partial view in section of an automobile thermostat incorporating the present invention;

Figure 2 is a graph showing the vapor pressures in pounds per square inch for various compositions of the invention and for the present standard automobile thermostat charging fluid at various temperatures.

There is shown in Figure 1 an automobile thermostat in which the present invention has particular utility. For the purposes of illustration the invention will be described in detail as used in this application, but it is to be understood that the invention can be used in other types of thermostats and in other places where thermostats may properly be used. The numeral 10 in Figure 1 designates a conduit leading to the radiator and the numeral 12 designates the wall of the water jacket in an automobile engine. Disposed in the heating fluid within the water jacket 12 is an expansible bellows 14 supported therein by a strap 16. The lower end of bellows 14 is attached to strap 16 and the upper end is free to move in a vertical direction as viewed in Figure 1. Mounted on the upper end of bellows 14 is an operating arm 18 which moves in accordance with the expansion of the bellows 14.

The bellows strap is supported from a casing 20 the upper part of which is provided with a valve seat on which is mounted a valve head 22. The valve head 22 is pivotally attached to arm 18 at the point 24 and one side thereof contacts the abutment member 26 which serves to guide valve head 22 from closed position into the open position shown in dotted lines, when arm 18 is moved upwardly.

The bellows 14 has disposed therein a temperature expansible composition. The charging composition is so chosen and the bellows is partially evacuated so that at about 150° F. the pressure within the bellows is substantially less than atmospheric pressure so that the bellows is normally under compression at lower temperatures. In a typical structure at 150° F. the charging composition has a pressure of 11 pounds per square inch and the pressure exerted by the compressed bellows is 4 pounds per square inch upwardly so that the combined pressures of the bellows and the charging composition equals atmospheric pressure.

The function of the thermostat of Figure 1 in an automobile is to keep the passageway 10 to the radiator closed until the water in the motor block reaches a predetermined temperature such as 150° F. At this temperature it is desirable that the bellows begin moving the valve 22 to the dotted or open position, and that upon further rise of temperature the valve 22 be completely opened and held open. When valve 22 is in the open position the cooling fluid for the motor is circulated through the radiator thereby providing for maximum cooling.

The bellows 14 is hermetically sealed but occasionally due to corrosion or other causes the bellows develops a leak. If this should happen it is desirable that the coolant for the motor be circulated through the radiator and this necessitates the opening of valve 22. Due to the arrangement described above wherein the bellows 14 is under compression, or put another way, the bellows 14 is slightly evacuated at low temperatures, the inherent tendency of the bellows 14 to move upwardly will cause valve 22 to be opened if a leak occurs in bellows 14 thus permitting atmospheric pressure to be present therein. This is a so-called "safe open" thermostat and is the type in general use today.

Since the bellows 14 exerts substantially no upward pressure due to its own resiliency when valve 22 is open, the charging fluid within the bellows 14 must exert a continuously increasing pressure in an amount greater than that required to simply move bellows 14 to the expanded position. More specifically, in the full open position there will be no aid from the resiliency of the bellows to hold valve 22 in the open position. The charging fluids utilized in automobile thermostats heretofore did not produce the desired increased pressure with a given predetermined increase in temperature, i. e., the vapor pressure of the charging fluid did not increase rapidly enough with a given increase in temperature.

It has now been discovered that the desired increased pressure with a given predetermined increase in temperature can be obtained in a thermostat operable within the temperature range of a conventional automobile thermostat structure by making a charging composition therefor comprising a solvent consisting of mixtures of water and water soluble, neutral, polar, oxygenated organic compounds or water alone, ammonia, and an acidic gas reversibly reactable with ammonia.

The ammonia may be added as ammonia gas, an aqueous solution of ammonia, or as the salt of the weak acid used (i. e. ammonium carbonate) or any other way that might be suggested to those skilled in the art.

In general, any water soluble, neutral, polar solvent may be used. Examples of such solvents are water or any water soluble, neutral, oxygenated organic compound, which is inert to the ammonia and acid gas used, such as methanol, ethanol, n-propanol, iso-propanol, any butanol, ethylene glycol, trimethylene glycol, propylene glycol, diethylene glycol, 2-ethoxyethanol, dimethyl ketone, glyceral and others.

Any suitable acidic gas may be utilized in the practice of the invention provided that the gas reversibly reacts with ammonia. Examples of acidic gases that may be used are carbon dioxide, sulfur dioxide, hydrogen sulfide, hydrogen cyanide or one of the halogen acids such as hydrofluoric, hydrochloric or hydrobromic acid.

For the benefit of those skilled in the art, we give hereinafter a number of representative examples which are by no means exhaustive, but are sufficient to teach those skilled in the art the manner in which our invention may be practiced. The following examples are not to be construed as a limitation of the invention but only as illustrations thereof.

EXAMPLE I 5 grams of solid ammonium carbonate $$((NH_4)_2CO_3 \cdot H_2O)$$

are added to the bellows of a thermostat having 17 ml. capacity in the open position and 9½ ml. capacity in the closed position.

EXAMPLE II

Equal parts by weight of water and solid ammonium carbonate $((NH_4)_2CO_3 \cdot H_2O)$ are added to a thermostat as described in Example I.

EXAMPLE III 10.6 parts by weight of solid ammonium carbonate $((NH_4)_2CO_3 \cdot H_2O)$ are added to a solution containing 42.7 parts by weight of water and 54 parts by weight of methanol.

EXAMPLE IV

A solution is prepared consisting of 46 parts by weight of water, 54 parts by weight of methanol, and 8.1 parts by weight of ammonia. Carbon dioxane is bubbled into this mixture until 6.5 parts by weight of carbon dioxide is absorbed.

EXAMPLE V

A solution is prepared consisting of 17.2 parts by weight of ammonia in 100 parts by weight of water. Hydrogen sulfide is bubbled into this mixture until 13.8 parts by weight of hydrogen sulfide is absorbed.

The compositions disclosed in the examples are tested by determining the vapor pressures at various temperatures. These vapor pressures are tabulated in Table I. The compositions considered to be good prior to this invention are also tested as reference systems and shown for the sake of comparison.

Table I
REFERENCE SYSTEMS

| Composition | Vapor Pressure in Lbs./In.² at T.° F. | | | | | | | |
|---|---|---|---|---|---|---|---|---|
| | 120° | 130° | 140° | 150° | 160° | 170° | 180° | 190° |
| 62.5% Methanol | 4.2 | 5.7 | 7.4 | 9.3 | 11.7 | 15.0 | 18.3 | 22.1 |
| 100% Methanol | 7.1 | 9.0 | 11.5 | 14.7 | 18.2 | 22.3 | 27.1 | 32.9 |
| 95% Ethanol | 4.2 | 5.4 | 6.6 | 8.8 | 11.1 | 13.7 | 16.7 | 20.2 |

SYSTEMS OF THE INVENTION

| Composition | 120° | 130° | 140° | 150° | 160° | 170° | 180° | 190° |
|---|---|---|---|---|---|---|---|---|
| Example I | 4.7 | 7.1 | 10.3 | 11.1 | 12.7 | 23.2 | 43.5 | |
| Example II | 6.8 | 11.3 | 17.3 | 28.6 | 44.3 | 55.3 | 66.3 | |
| Example III | 9.8 | 13.6 | 19.1 | 25.1 | 33.6 | 43.1 | 54.6 | 69.2 |
| Example IV | 7.7 | 10.3 | 14.5 | 20.0 | 25.7 | 34.0 | 44.7 | 56.7 |
| Example V | 8.3 | 10.6 | 13.4 | 17.1 | 22.1 | 27.6 | 35.1 | 43.1 |

The pressure-temperature relationships are shown graphically in Figure 2 with the logarithm of the pressure as the ordinate and the reciprocal of the absolute temperature (in degrees Rankin) as the abscissa. In order to use the original units the ordinate is divided on a logarithmic scale with the pressures (in lbs./in.²) labeled and the positions corresponding to the temperature in ° F. are drawn in at their corresponding places on the scale in reciprocal degrees Rankin. By using these scales the graph becomes nearly a straight line and the rate of change in pressure with respect to the rate of change of the temperature is illustrated as the slope of this line.

A comparison of the slopes of the graphs representing the examples with the slopes of the graphs representing the reference systems in Figure 2 makes the superiority of the compositions of the invention quite obvious.

Table II discloses comparatively the temperature ranges necessary to increase the pressure exerted by various charging compositions in an automobile thermostat from the pressure required to start to open the thermostat to the pressure required to hold the thermostat in the fully opened position.

The unusual effects obtained by the compositions of the present invention are evident by comparison with the reference systems of charging compositions now in use.

$\Delta P/\Delta T$ is calculated by the following formula:

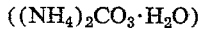

$$\frac{\Delta P}{\Delta T} = \frac{P_2 - P_1}{T_2 - T_1}$$

wherein $P_1$ is the pressure required to start opening the hereinbefore described thermostat, $P_2$ is the pressure required to keep the thermostat fully open, $T_1$ is the temperature at which the composition exerts the pressure $P_1$ when confined as hereinbefore described, and $T_2$ is the temperature at which the composition exerts the pressure $P_2$. $\Delta P/\Delta T$ represents the average rate of increase of pressure with temperature over the range of pressures from $P_1$ to $P_2$ and it has the dimensions of pounds per square inch per degree Rankin.

The superiority of the compositions of the invention is graphically evident by comparing their $\Delta P/\Delta T$ values with the $\Delta P/\Delta T$ values of the reference compositions.

Table II
REFERENCE SYSTEMS

| Composition from Examples | Temp. Range, ° F. for V. P. of 10.5–22.2 p. s. i. | $\Delta P/\Delta T$ | Superior to References |
|---|---|---|---|
| 100% Methanol | 136–170 | .344 | |
| 80% Methanol | 147–184 | .316 | |
| 62.5% Methanol | 155–190 | .334 | |

SYSTEMS OF THE INVENTION

| Composition from Examples | Temp. Range, ° F. for V. P. of 10.5–22.2 p. s. i. | $\Delta P/\Delta T$ | Superior to References |
|---|---|---|---|
| Example I | 141–169 | .418 | yes |
| Example II | 128–146 | .876 | yes |
| Example III | 122–145 | .509 | yes |
| Example IV | 131–155 | .488 | yes |
| Example V | 130–160 | .390 | yes |

The term "reversibly reactable" as used herein refers to an acid gas that will react within a closed chamber with a compound at a given temperature, and will be released at an increased temperature, but upon cooling to the given temperature will react again to give the same composition that was present before the increase in temperature. By this mechanism the acid gas may be added to the ammonia, then released by an increase in temperature, and then recombined with the ammonia by cooling to the original temperature. This addition and decomposition must be able to take place many times without side reactions that would destroy the effectivness of the composition.

It will be seen that there has been provided a thermostat and a charging fluid therefor which fulfill the objects and advantages set forth above. Although certain specific examples and a particular type and installation of thermostat have been shown for purposes of illustration, it is to be understood that various changes can be made therein without departing from the spirit and scope of the invention.

We claim:

1. A temperature responsive charging composition for a thermostat and consisting essentially of ammonia, an acidic gas reversibly reactable with said ammonia, a reaction product of said ammonia with said acidic gas, and a solvent for dissolving each of said ammonia, said acidic gas and said reaction product, said solvent being selected from the class consisting of water, water soluble aliphatic alcohols containing one to five carbon atoms and mixtures thereof, said compound when confined to form a single closed system including a gaseous phase and a liquid phase in equilibrium at any given temperature, the ratio of total free and reacted ammonia to total free and reacted acidic gas in the system being constant but the ratios of free ammonia and free acidic gas to reacted ammonia and reacted gas in the sysem being functions of the temperature of the system, and the vapor pressure of said composition when confined being a function of the temperature of the system.

2. A composition according to claim 1 wherein said acidic gas is in an amount approximately stoichiometrically equivalent to said ammonia.

3. A composition according to claim 1 wherein said gas is carbon dioxide.

References Cited in the file of this patent

UNITED STATES PATENTS

| | | |
|---|---|---|
| 224,246 | Motay | Feb. 3, 1880 |
| 1,159,893 | Browne et al. | Nov. 9, 1915 |
| 1,251,538 | Keyes | Jan. 1, 1918 |
| 2,137,602 | Boehr et al. | Nov. 22, 1938 |
| 2,259,846 | Vernet et al. | Oct. 21, 1941 |
| 2,311,342 | Kerns et al. | Feb. 16, 1943 |